May 3, 1960     C. C. ALLEN     2,935,742
SWITCHING ARRANGEMENT FOR RADAR SYSTEMS
Filed Feb. 9, 1956
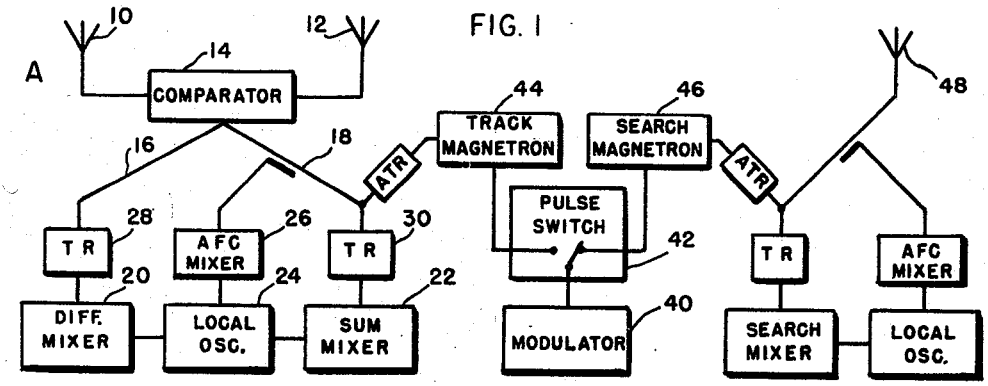
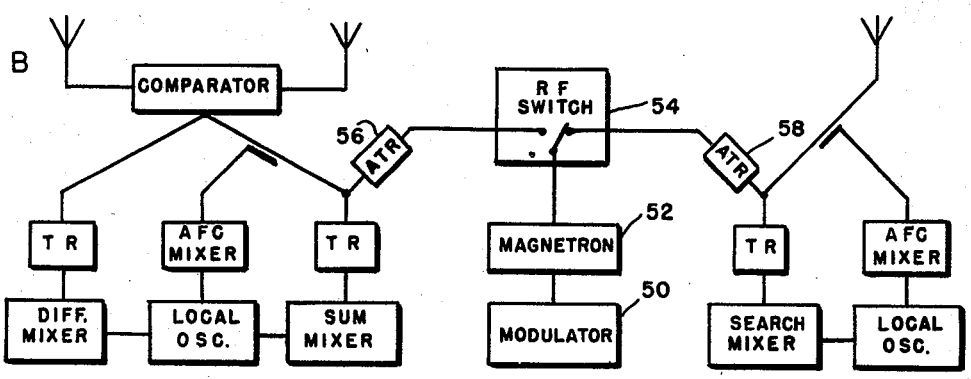
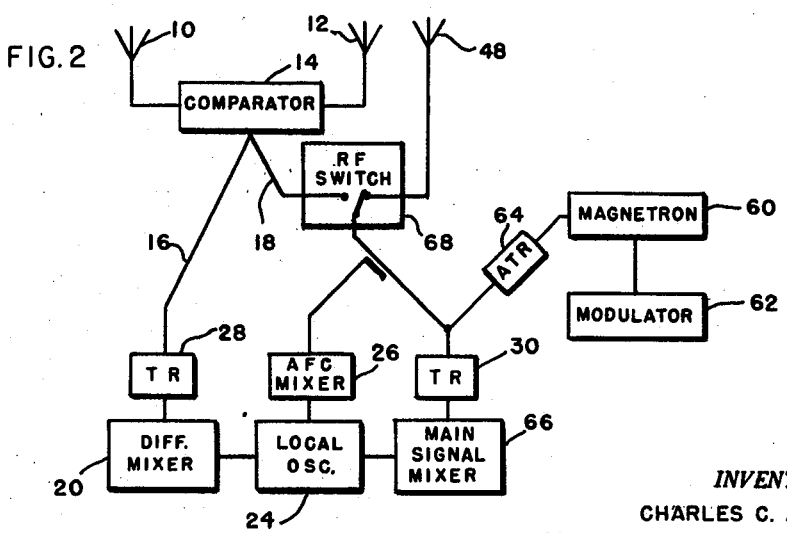
INVENTOR.
CHARLES C. ALLEN
BY
*Harry M. Saragovitz*
ATTORNEY United States Patent Office 2,935,742
Patented May 3, 1960

2,935,742
SWITCHING ARRANGEMENT FOR RADAR SYSTEMS

Charles C. Allen, Schenectady, N.Y., assignor to the United States of America as represented by the Secretary of the Army Application February 9, 1956, Serial No. 564,595

3 Claims. (Cl. 343—5)

This invention relates to a combined radar searching and tracking system and more particularly to a switching device in a radar system wherein tracking is achieved by utilizing a monopulse feed system.

In certain radar systems, it is desired to have both search and track functions performed sequentially; that is, after a target is located by searching, the equipment is switched to track to follow the target. Such systems normally utilize separate feeds for search and tracking and once a target is located by the search antenna, the tracking feed is switched into operation by means of a suitable switching arrangement. In certain types of such radar equipment, the location of the switch with respect to the transmitting, duplexing and antenna systems has a great effect on the efficiency of the radar system as a whole. This is especially true where it is proposed to employ the so-called monopulse technique for the track radar and also provide a common antenna structure for both the search and track radar systems. The monopulse technique in radar consists in deriving sufficient information on a single pulse by multiple, simultaneously acting receiving channels to determine completely both the angular position and the range of a target or targets. The three basic types of monopulse systems are referred to as (1) the four-feed phase comparison system, (2) the four-feed amplitude comparison system and (3) the two feed phase-amplitude system which is a combination of (1) and (2). Although the present invention will be described in connection with the two feed-phase-amplitude system, it is to be understood that the invention is not to be limited thereto. Heretofore, systems which combined monopulse tracking techniques with the search function required duplication of the radio-frequency components such as the ATR and TR tubes, AFC mixer, and local oscillator, with the concomitant disadvantages of additional weight, space limitations, and the problem of placing the magnetron at its optimum position with respect to the ATR tubes.

It is an object of the present invention to provide an improved switching arrangement in a combined track and search radar system wherein a single magnetron transmitter and a single duplexer are used for both search and track radar.

It is another object of the present invention to provide an improved switching arrangement wherein the magnetron transmitter may be located at an optimum position with respect to the duplexer.

In the description below, the term "antenna feed" refers to the primary source of radiation of a microwave antenna system as defined in page 12 of "Microwave Antenna Theory and Design," volume 12, of the Massachusetts Institute of Technology Radiation Series (1949). Schematically, such antenna feeds will be represented in the drawings by the conventional antenna symbol.

In brief, the present invention relates to an improved switching arrangement in a radar system wherein a monopulse tracking system having discrete antenna feeds is combined with a search system having a discrete antenna feed. The radar system includes a source of pulsed radio-frequency energy, a duplexer responsive to both the transmitted radio-frequency energy and the received signal energy, and a hybrid comparator responsive to the combined outputs of the track system antenna feeds and adapted to produce respective sum and difference signals of the voltages received at said track system antenna feeds. The radar system further includes means for coupling the sum signal to the duplexer. In accordance with the present invention, there is provided a radio-frequency switch disposed in the sum signal coupling means for selectively coupling the pulsed radio-frequency energy source to either the track system antenna feeds or the search system antenna feed.

For a better understanding of the invention, together with other and further objects thereof, reference is had to the following description taken in connection with the accompanying drawing, in which:

Figs. 1A and 1B show the prior art systems, and
Fig. 2 illustrates schematically a preferred embodiment of the present invention.

Figs. 1A and 1B illustrate two known prior art systems which combine the phase-amplitude type monopulse technique for tracking with a search system. It is to be understood, of course, that the lines shown interconnecting and coupling the components of the system are merely a schematic representation of wave guide structures well-known in the art. In brief, the track system shown in Figs. 1A and 1B includes a combined phase-amplitude comparison system utilizing two separate antenna feeds 10 and 12 which are mutually coupled to a magic-T or hybrid comparator waveguide circuit 14. The antenna feeds 10 and 12 usually comprise specially designed pillbox type antenna feeds placed one above the other so that two beams are produced which are squinted with respect to each other in elevation, and also displaced with respect to each other laterally so that the respective phase centers are displaced in azimuth. With such an arrangement, the voltages received at the track system antenna feeds are combined in comparator waveguide circuit 14 which produces sum and difference signals. The sum signal is the reference voltage with which the difference signal is compared. Theoretically the difference signal consists of an in-phase amplitude unbalance signal when there is an error in elevation and a quadrature phase unbalance signal when there is an error in azimuth. The discrete outputs of the comparator are applied through respective difference and sum output channels 16 and 18 to respective mixers designated as the difference mixer 20 and the sum mixer 22 to which are applied a heterodyne signal from local oscillator 24. The frequency of local oscillator 24 is controlled by a conventional AFC mixer circuit illustrated at 26 which is coupled to sum output channel by means of a directional coupler. As shown, the signals are applied to the mixers through respective TR tubes 28 and 30. The respective outputs of the mixers 20 and 22 are the complex error and sum input signals to the track receiver (not shown) corresponding to the combined error in elevation and azimuth and the reference or range signal.

In the system of Fig. 1A two complete separate magnetron transmitters and receivers are used for track and search respectively. As shown, a single modulator 40 is switched by means of a suitable pulse switch 42 to connect with either the track magnetron 44 which supplies energy to track system antenna feeds 10 and 12, or the search magnetron 46 which supplies energy to search system antenna feed 48. In Fig. 1B there is shown a single modulator 50 and a single magnetron 52 arranged so that the output of the magnetron may be connected to either the search or the track system antenna feeds by means of a suitable wave guide radio-frequency switch 54. The remaining structure of Fig. 1B is the same as that shown in Fig. 1A. In both Figs. 1A and 1B many of the radio frequency components are duplicated for both the search and track systems, namely, the duplexer including ATR and TR tubes, AFC mixer, circuit, and local oscillator. The system in Fig. 1A has the further disadvantage in that the magnetron which is not in use is not in a stand-by warmed up condition and full power cannot be applied suddenly upon switching. This increases the switching time by the required warm up time. The system in Fig. 1B has the further disadvantage in that the bandwidth of the system is reduced because the magnetron cannot be placed at its optimum position with respect to the ATR tubes 56 and 58 inasmuch as the ATR tubes are not perfect devices. The bandwidth of the duplexer is directly affected by the magnetron impedance as transformed along the waveguide to the location of the ATR tubes.

Referring now to Fig. 2 where like numerals refer to like elements in the track system, at 60 there is shown a magnetron transmitter adapted to be pulsed into oscillations of radio-frequency energy by modulator 62. A conventional duplexer arrangement comprising ATR tube 64 and TR tube 30 is provided between magnetron 60 and the input to main signal mixer 66 to isolate transmitted and received signals in the usual manner. The pulsed radio-frequency energy from transmitter 60 is applied through ATR tube 64 to either the search system antenna feed 48 or the track system antenna feeds 10 and 12 by means of a suitable radio frequency switch 68 disposed in output channel 18 of hybrid comparator 14 which provides the sum of the received signals from track feeds 10 and 12. As shown, the sum output channel 18 terminates at the junction of ATR tube 64 and TR tube 30, and radio-frequency switch 68 is so arranged that when magnetron 60 is connected to search system antenna feed 48, no radio-frequency energy is applied to or received from the track system antenna feeds through comparator 14, and when it is connected to track system antenna feeds 10 and 12 through comparator 14 no signal is applied to or received from search system antenna feed 48. Since the same duplexer is used for both track and search operation, the main signal mixer 66 is used for both the search mixer and the track sum-channel mixer. With such an arrangement a single AFC mixer circuit 26 and a single local oscillator 24, are used for both search and track, thus greatly simplifying the systems shown in Figs. 1A and 1B. The difference output channel 16 which feeds into difference mixer 20 through TR tube 28 is identical to that shown in Figs. 1A and 1B.

It is to be understood that the switching arrangement shown in Fig. 2 is not limited only to the phase-amplitude type of monopulse tracking system described. It can also be used with the four-feed amplitude and four-feed phase types of monopulse tracking system when combined with a search system. In the latter case the waveguide circuitry to the left of the radio frequency switch 68 includes three more magic tees, two additional feeds, and another mixer and TR tube, but the circuitry to the right of the radio frequency switch 68 remains unchanged.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. In a radar system for detecting and tracking target echoes wherein a monopulse tracking system having discrete antenna feeds is combined with a search system having a discrete antenna feed and including a source of pulsed radio-frequency energy, a duplexer system responsive to said radio-frequency energy and the detected echo signals, a hybrid waveguide comparator responsive to the combined outputs of said track system antenna feeds and adapted to produce respective sum and difference signals of the voltages derived from said track system antenna feeds and means for coupling said sum signal to said duplexer system; the improvement comprising means in said sum signal coupling means for selectively connecting said radio-frequency energy source to either said track system antenna feeds or to said search system antenna feed.

2. In a radar system for detecting and tracking target echoes wherein a monopulse tracking system having discrete antenna feeds is combined with a search system having a discrete antenna feed and including a source of pulsed radio-frequency energy, a duplexer system responsive to said radio frequency energy and the detected echo signals, a hybrid waveguide comparator responsive to the combined outputs of said track system antenna feeds and adapted to produce respective sum and difference signals of the voltages derived from said track system antenna feeds, and a waveguide for coupling said sum signal from said comparator to said duplexer; the improvement comprising a radio-frequency switch disposed in said waveguide intermediate said duplexer and said comparator for selectively connecting said radio-frequency energy source to either said track system antenna feeds or to said search system antenna feed.

3. In a radar system for detecting and tracking target echoes wherein a monopulse tracking system having discrete antenna feeds is combined with a search system having an antenna feed and including a source of pulsed radio frequency energy, a hybrid waveguide comparator responsive to the combined outputs of said track system antenna feeds and adapted to produce respective sum and difference signals of the voltages derived from said track system antenna feeds, a signal mixer, a duplexer comprising a TR tube and an ATR tube connected in that order between said mixer and said pulsed radio frequency energy source, and a waveguide for coupling the sum signal from said comparator to said duplexer; the improvement comprising a radio frequency switch disposed in said waveguide intermediate said comparator and the junction of said ATR and TR duplexer for selectively connecting said radio frequency energy source to either said track system antenna feeds or to said search system antenna feed whereby the received target echoes detected by either of said track system or search system antenna feeds when in circuit with said frequency energy source are applied to said signal mixer.

References Cited in the file of this patent

UNITED STATES PATENTS

| | | |
|---|---|---|
| 2,254,693 | Everett | Sept. 2, 1941 |
| 2,426,217 | Hoisington | Aug. 26, 1947 |
| 2,576,943 | Jenks | Dec. 4, 1951 |
| 2,619,635 | Chait | Nov. 25, 1952 |
| 2,663,868 | Tasker | Dec. 22, 1953 |
| 2,687,520 | Fox | Aug. 24, 1954 |